(12) United States Patent
Vyskocil

(10) Patent No.: US 12,508,902 B2
(45) Date of Patent: Dec. 30, 2025

(54) ELECTRONIC THROTTLE CONTROL PEDAL ASSEMBLY

(71) Applicant: KSR IP Holdings, LLC, Wilmington, DE (US)

(72) Inventor: Matthew Vyskocil, Ridgetown (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/646,201

(22) Filed: Apr. 25, 2024

(65) Prior Publication Data

US 2024/0270070 A1 Aug. 15, 2024

Related U.S. Application Data

(63) Continuation of application No. 18/121,116, filed on Mar. 14, 2023, now Pat. No. 11,999,229, which is a continuation of application No. 17/824,154, filed on May 25, 2022, now Pat. No. 11,628,725.

(60) Provisional application No. 63/192,808, filed on May 25, 2021.

(51) Int. Cl.
   *B60K 26/02* (2006.01)
   *G05G 5/03* (2008.04)
   *G05G 1/38* (2008.04)
   *G05G 1/44* (2008.04)

(52) U.S. Cl.
   CPC .............. *B60K 26/021* (2013.01); *G05G 5/03* (2013.01); *B60K 2026/023* (2013.01); *G05G 1/38* (2013.01); *G05G 1/44* (2013.01)

(58) Field of Classification Search
   CPC ................................................ B60K 2026/023
   See application file for complete search history.

(56) References Cited

U.S. PATENT DOCUMENTS

| 7,921,748 | B2 | 4/2011 | Kim et al. | |
|---|---|---|---|---|
| 8,042,430 | B2 * | 10/2011 | Campbell | G05G 1/38 74/513 |
| 8,161,842 | B2 | 4/2012 | Kim et al. | |
| 8,534,157 | B2 | 9/2013 | O'Neill | |

(Continued)

FOREIGN PATENT DOCUMENTS

| DE | 102008003296 A1 | 7/2009 |
|---|---|---|
| DE | 102015214658 A1 | 7/2015 |

(Continued)

*Primary Examiner* — Vicky A Johnson
(74) *Attorney, Agent, or Firm* — Dinsmore & Shohl LLP

(57) ABSTRACT

An electronic throttle control pedal assembly includes a housing having a friction generating surface, a pedal arm, a spring carrier, and at least one spring. The pedal arm includes a hub portion and a friction generating member. The friction generating member has a lobe connected to a cross member and is positioned on a side surface of the hub portion. The cross member extends within the hub portion. The spring carrier has a friction generating portion. As the pedal arm is depressed, a portion of the spring carrier engages the friction generating portion against the cross member positioned within the hub aperture and pivotally engages a portion of the lobe of the friction generating member against the friction generating surface of the housing thereby creating at least two independent friction generating surfaces to create a hysteresis proportional to the depression of the pedal arm.

20 Claims, 8 Drawing Sheets

(56) References Cited

U.S. PATENT DOCUMENTS

| | | |
|---|---|---|
| 8,806,977 B2 | 8/2014 | Stewart et al. |
| 9,075,427 B2 | 7/2015 | Muraji et al. |
| 9,079,492 B2 | 7/2015 | Osawa et al. |
| 9,671,815 B2 | 6/2017 | Fuller et al. |
| 9,811,108 B2 | 11/2017 | Kumanmoto et al. |
| 10,401,896 B1 | 9/2019 | Kim et al. |
| 10,921,843 B2 | 2/2021 | Nagashima et al. |
| 2002/0152831 A1 | 10/2002 | Sakamoto et al. |
| 2010/0300240 A1 | 12/2010 | Kim et al. |
| 2011/0197700 A1 | 8/2011 | O'Neill |
| 2012/0085196 A1 | 4/2012 | Watanabe |
| 2013/0091977 A1 | 4/2013 | Fukushima et al. |
| 2013/0133466 A1 | 5/2013 | Inuzuka et al. |
| 2015/0007684 A1 | 1/2015 | Saito et al. |
| 2015/0277479 A1 | 10/2015 | Viethen et al. |
| 2020/0310484 A1 | 10/2020 | Iwasaki et al. |

FOREIGN PATENT DOCUMENTS

| | | | |
|---|---|---|---|
| DE | 102014106329 A1 | 11/2015 | |
| DE | 202022101309 U1 | 4/2022 | |
| JP | 2007504056 A | 3/2007 | |
| KR | 20210045546 A | 4/2021 | |
| WO | WO-2004108465 A1 * | 12/2004 | ........... B60K 26/021 |

\* cited by examiner

ELECTRONIC THROTTLE CONTROL PEDAL ASSEMBLY

CROSS-REFERENCE TO RELATED APPLICATIONS

This utility patent application is a continuation of co-pending U.S. patent application Ser. No. 18/121,116, filed Mar. 14, 2023, which itself is a continuation application of U.S. patent application Ser. No. 17/824,154, filed May 25, 2022, which in turn claims priority benefit from U.S. Provisional Patent Application Ser. No. 63/192,808, filed May 25, 2021, and entitled "Electronic Throttle Control Pedal Assembly", the entire contents of which are incorporated herein in their entirety.

TECHNICAL FIELD

The present specification generally relates to pedal assemblies for vehicles and, more specifically, to pedal assemblies with a mechanical resistance with hysteresis and a position sensor output measuring pedal movement.

BACKGROUND

Electronic throttle controlled (ETC) pedal assemblies are well known. In ETC pedal assemblies, an accelerator pedal is coupled or in communication with a throttle, replacing mechanical linkage. Generally, ETC pedal assemblies include an accelerator pedal module, a throttle valve that can be opened and closed by an electric motor, and a powertrain or engine control module that employs software to determine the required throttle position by calculations from data measured by other sensors. However, these known ETC pedal assemblies are not constructed to provide position sensor output to the powertrain controller and mechanical resistance with hysteresis to the driver's foot, both in relation to the position of the pedal.

SUMMARY

In one embodiment, an electronic throttle control pedal assembly for a vehicle is provided. The assembly includes a housing, a pedal arm, a spring carrier, and at least one spring. The housing has a friction generating surface. The pedal arm has a hub portion and a friction generating member. The friction generating member has a lobe. The lobe is positioned on a side surface of the hub portion. The pedal arm is pivotally connected to the housing at the hub portion. The spring carrier is coupled to the pedal arm and is received within the housing. The at least one spring is positioned to be in contact with the pedal arm and the spring carrier. When the pedal arm is depressed, the at least one spring and the spring carrier leverages a load applied by the at least one spring to pivotally engage at least a portion of the lobe of the friction generating member against the friction generating surface of the housing thereby creating a hysteresis proportional to the depression of the pedal arm.

In another embodiment, a pedal assembly for a vehicle is provided. The assembly includes a housing and a pedal arm assembly. The housing has a friction generating surface. The pedal arm assembly has a pedal arm having an exterior surface and an opposite inner surface. The pedal arm further includes a hub portion and a friction generating member, a spring carrier, and at least one spring. The hub portion is curvilinear in shape. The friction generating member has a pair of spaced apart lobes connected by a cross member. Each of the pair of lobes is positioned on a respective side surface of the hub portion and the cross member extending within the hub portion. Each of the pair of lobes of the friction surface geometrically matches the curvilinear shape of the hub portion. The pedal arm is pivotally connected to the housing at the hub portion. The spring carrier is coupled to the pedal arm and is received within the housing. The spring carrier has a friction generating portion extending from a rear surface. The at least one spring extends between the inner surface of the pedal arm and the spring carrier. When the pedal arm is depressed, the at least one spring and the spring carrier leverages a load applied to the at least one spring by movement of the pedal arm to engage the friction generating portion against the cross member of the friction generating member positioned within the hub aperture and a portion of the lobe of the friction generating member is pivotally engaged against the friction generating surface of the housing thereby creating at least two independent friction generating surfaces to create a hysteresis proportional to the depression of the pedal arm.

A method of a final assembly of installing a pedal arm assembly into a housing is provided. The method includes the steps of: inserting an inner spring with an outer diameter into an inner diameter of an outer spring to form a spring package, the outer diameter of the inner spring is smaller than the inner diameter of the outer spring, inserting one end of the spring package into a spring receiving portion of a pedal arm, inserting another end of the spring package into a spring receiving portion of a spring carrier, and inserting the spring carrier and the pedal arm into a hub receiving cavity of the housing such that the pedal arm and the spring carrier are pivotally mounted to the housing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
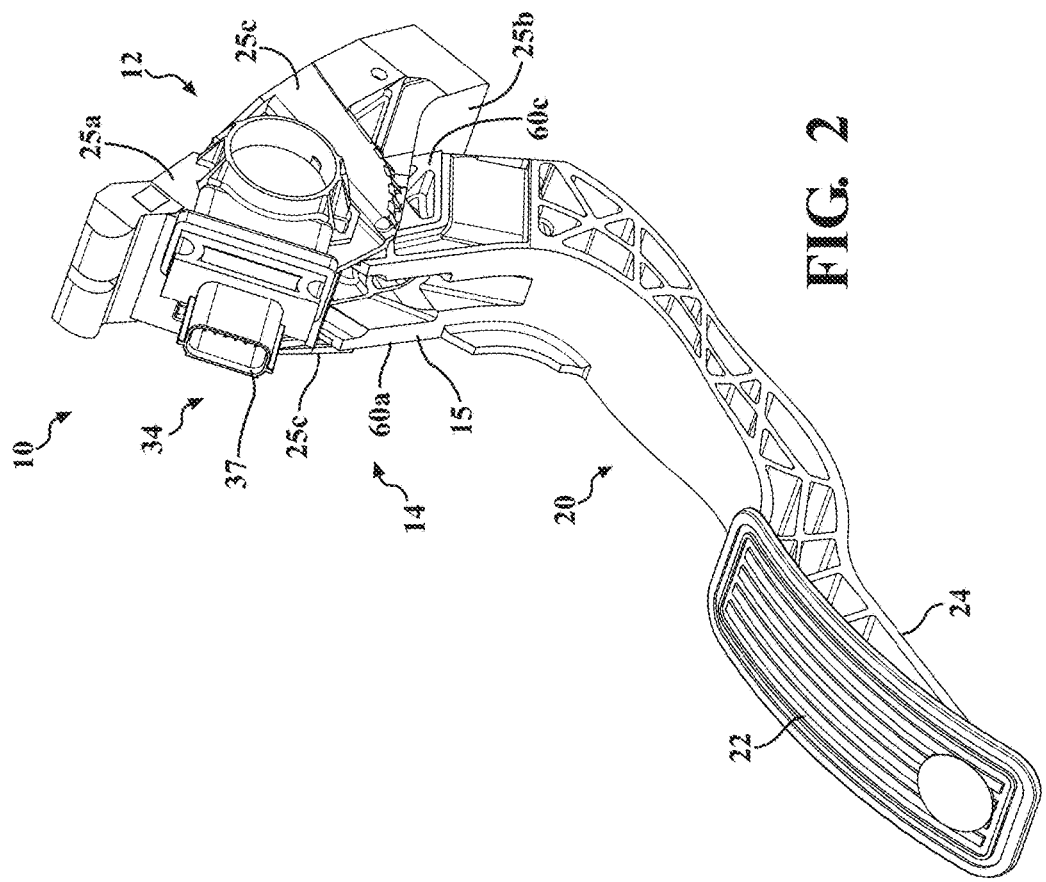
FIG. 2 schematically depicts a right side perspective view of the electronic throttle pedal assembly of FIG. 1 according to one or more embodiments shown and described herein.
Figure 1:
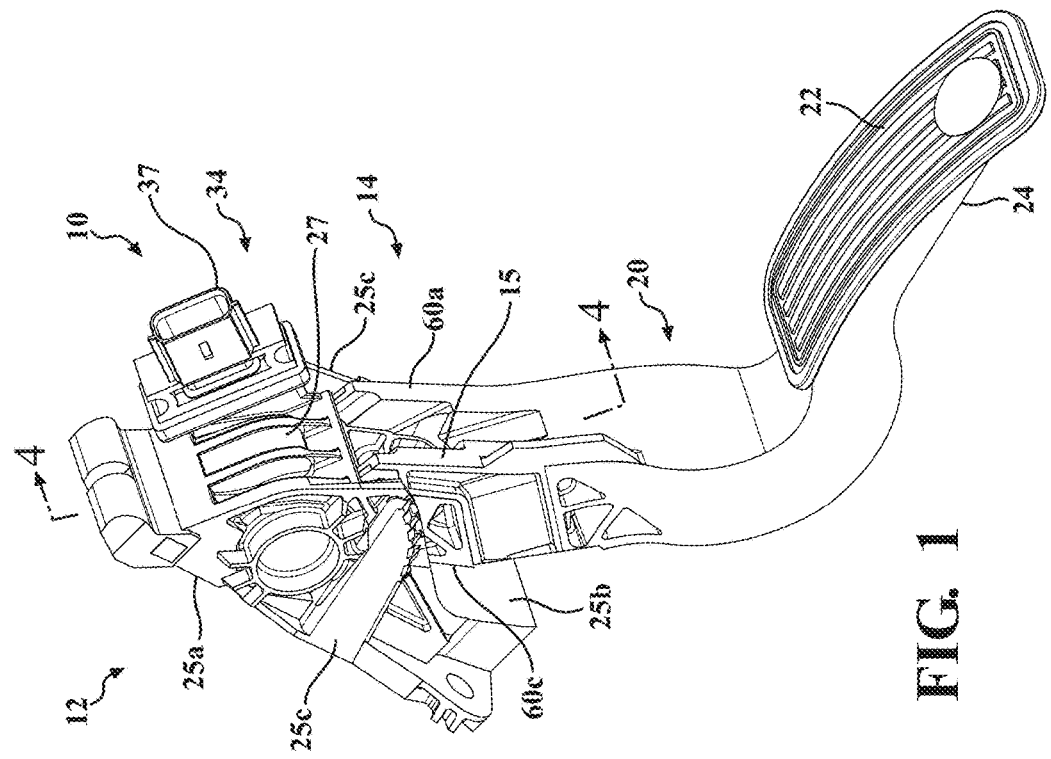
FIG. 1 schematically depicts a left side perspective view of an electronic throttle pedal assembly according to one or more embodiments shown and described herein.
Figure 3:
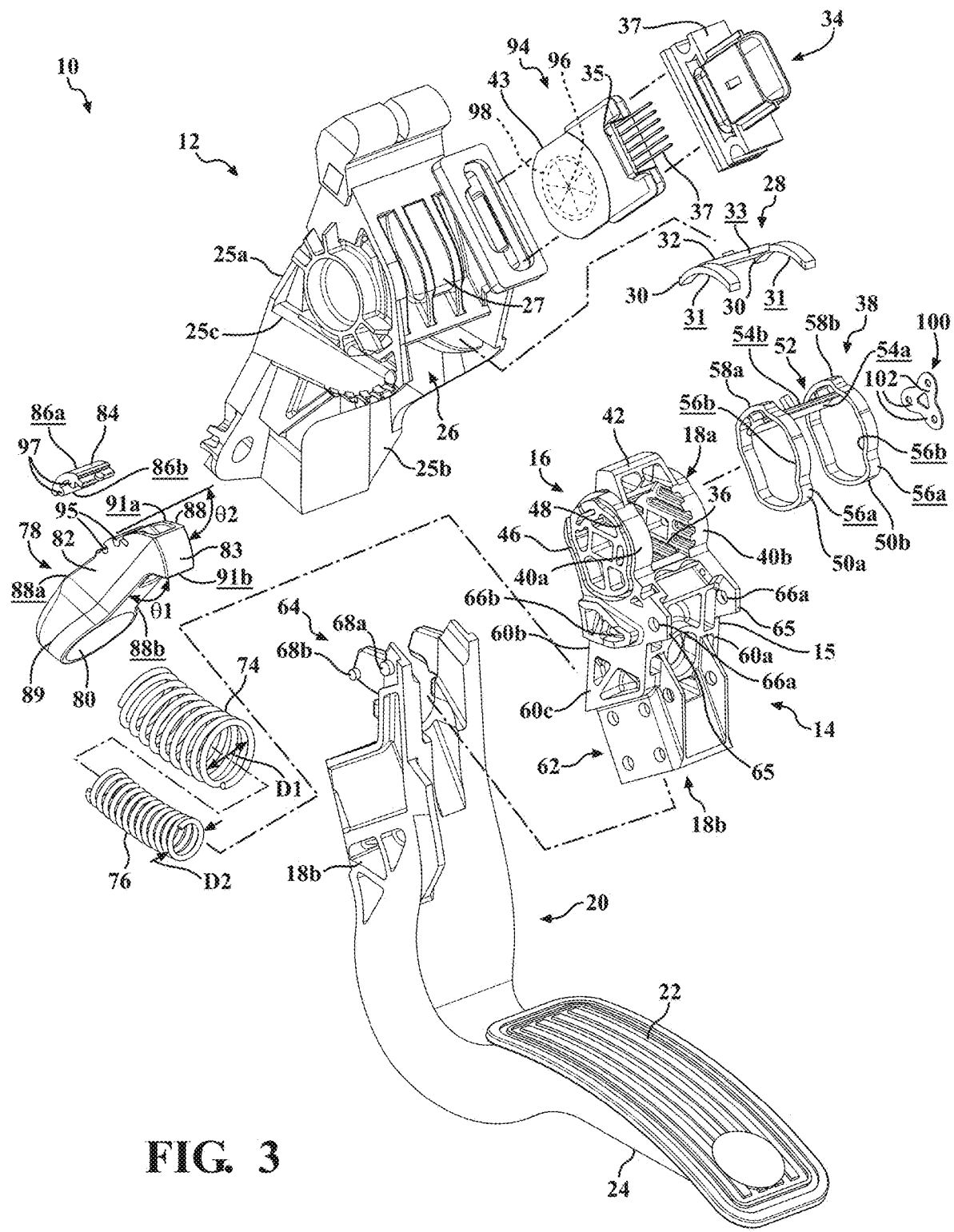
FIG. 3 schematically depicts an exploded perspective view of the electronic throttle pedal assembly of FIG. 1 according to one or more embodiments shown and described herein.

Embodiments described herein are directed to an electronic throttle control (ETC) pedal assembly having a simplified final assembly process compared to conventional ETC assemblies. Further, embodiments of the ETC pedal assembly described herein include an inductive coupler and sensor assembly to detect movement of the coupler. Further still, embodiments of the ETC pedal assembly described herein include at least two independent friction generating surfaces to create a hysteresis proportional to the depression of a pedal arm.

The ETC pedal assembly includes a housing, a pedal arm and a lower pedal arm. The housing includes a receiving cavity and a friction generating surface. The pedal arm includes a hub portion and a friction generating member. The friction generating member has a pair of spaced apart lobes connected by a cross member. The cross member may be an elongated member integrally formed with the pair of lobes. Each of the pair of lobes are positioned on a respectively side surface of the hub portion and the cross member extends across and within the hub portion such that a portion of the cross member is exposed within a hub aperture. The pedal arm is pivotally connected to the housing at the hub portion. As such, when the pedal arm is pivoted, the pedal arm moves the friction generating member of the pedal arm to slidably engage against the friction generating surface of the housing.

A spring carrier is coupled to the pedal arm and is received within the housing. The spring carrier includes a spring receiving portion and an arm portion that extends from the spring receiving portion. A friction generating portion extends from the arm portion and is arcuate in shape. An outer spring with an inner diameter extends between an inner surface of the pedal arm and the spring receiving portion of the spring carrier. An inner spring is positioned within the inner diameter of the outer spring and extends between the inner surface of the pedal arm and the spring receiving portion of the spring carrier.

As the pedal arm is depressed, the pedal arm moves and the at least one spring displaces the spring carrier such that a portion of the spring carrier leverages against the housing to load the pedal arm pivot as it rotates. As the at least one spring compresses due to the rotation of the pedal arm, the spring carrier continues to transfer the load into the pivot of the pedal arm. As such, with the load applied, the friction generating portion is positioned against the exposed portion of the cross member of the friction generating member. As such, embodiments described herein disclose of at least two independent friction generating surfaces to create a hysteresis proportional to the depression of the pedal arm.

Various embodiments of the ETC assembly and methods for assembly thereof are described in detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Referring initially to FIGS. 1-10, an electronic throttle control (ETC) pedal assembly 10 is schematically depicted. The ETC pedal assembly 10 includes a housing 12 and a pedal arm assembly 14. The pedal arm assembly 14 includes a pedal arm 15, which includes a hub portion 16. The hub portion 16 is pivotally mounted to the housing 12. The pedal arm 15 includes an upper portion 18a and an opposite lower arm portion 18b. The lower arm portion 18b may be sized and shaped to be received by any number of lower pedal arms, such as the lower pedal arm 20. A pedal pad 22 is positioned at a distal end 24 of the lower pedal arm 20. As such, the pedal arm 15 pivots, moves, and/or rotates within the housing 12 based on a pressure applied to the pedal pad 22 at the distal end 24 of the lower pedal arm 20.

The housing 12 includes a back wall 25a and an opposite front wall 25b and a pair of sidewalls 25c. Further, the housing 12 may include a hub receiving cavity 26 that may further include a friction generating surface 28. In some embodiments, the hub receiving cavity 26 may be semicircular in shape. In other embodiments, the hub receiving cavity 26 may be rectangular, square, hexagonal, and/or the like. A pocket portion 27 is positioned within the hub receiving cavity 26 and is configured to receive a portion of the pedal arm 15, as discussed in greater detail herein. The housing 12 may include an aperture 29 extending through the back wall 25a to provide clearance for a spring carrier 78, as discussed in greater detail herein.

In some embodiments, the friction generating surface 28 is positioned within a portion of the hub receiving cavity 26 of the housing 12. In some embodiments, the friction generating surface 28 includes two legs 30, each arcuate in shape. A connecting member 32 may couple to each of the legs 30. In some embodiments, each of the two legs 30 are symmetrical or uniform in shape with respect to one another. In other embodiments, each of the two legs 30 are non-uniform or do not match in shape with respect to one another. In some embodiments, each of the two legs 30 include a surface 31 that are radiused or arcuate in shape. In other embodiments, each of surfaces 31 of the two legs 30 are shaped differently such as linear, curvilinear, and/or the like. In some embodiments, the connecting member 32 may have a surface 33 that has a radius or is arcuate in shape. In other embodiments, the surface 33 of the connecting member 32 may be linear, curvilinear, and/or the like.

The housing 12 further includes a connector opening 39. The connector opening includes a mounting portion 41 for a connector 37 of a connector assembly, as discussed in greater detail herein. The connector opening 39 provides access to the hub receiving cavity 26 such that components of the ETC pedal assembly 10, such as a sensor assembly 94, may be positioned within the hub receiving cavity 26 and exit the housing 12 via the connector opening 39, as discussed in greater detail herein.

The housing 12 may be mounted to a dash of a vehicle such as to an instrument panel, a firewall and/or the like. As such, the back wall 25*a* is coupled, mounted or otherwise attached to a component of the vehicle to hold the pedal pad 22 and a distal end of the lower pedal arm 20 off a vehicle floor in a vertical direction (i.e., in the +/−Z direction).

In some embodiments, the housing 12 may be formed with various materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like.

The friction generating surface 28 may be formed with the same material as the housing 12 or may be formed with a different material or combinations of different materials than the housing 12. For example, in some embodiments, both the housing 12 and the friction generating surface 28 may be formed with the acrylonitrile butadiene styrene material. In other embodiments, the housing 12 may be formed with acrylonitrile butadiene styrene material and the friction generating surface 28 may be formed with the polyethylene material. In another embodiment, the housing 12 may be formed with acrylonitrile butadiene styrene material and nylon while the friction generating surface 28 may be formed with acrylonitrile butadiene styrene material and a thermoplastic elastomer.

Further, in some embodiments, the housing 12 and/or the friction generating surface 28 may be formed from additive manufacturing techniques. Additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes. In other embodiments, the housing 12 and/or the friction generating surface 28 may be formed via injection molding techniques or other known techniques.

Still referring to FIGS. 1-10, the hub portion 16 of the pedal arm 15 is received in the hub receiving cavity 26 of the housing 12 to pivot, rotate, or move relative to the hub receiving cavity 26 of the housing 12. In some embodiments, the pedal arm 15 includes an exterior surface 60*a* and an opposite inner surface 60*b* and a pair of sides 60*c*. The hub portion 16 extends to each of the pair of sides 60*c* of the pedal arm 15 with a hub aperture 36 extending therebetween. The hub portion 16 may include a pair of side surfaces 40*a*, 40*b*, a protrusion 42 extending from an uppermost surface 44 of the side surfaces 40*a*, 40*b* and a hub aperture 36 extending between the pair of side surfaces 40*a*, 40*b* and open from the exterior surface 60*a* through the inner surface 60*c*. In some embodiments, the pair of side surfaces 40*a*, 40*b* are curvilinear in shape. In some embodiments, the uppermost surface 44 is generally arcuate in shape with a smooth transition contour.

Each of the pair of side surfaces 40*a*, 40*b* of the hub portion 16 may further include a cutout 46 or stepped portion that follows an outer circumference of the side surfaces 40*a*, 40*b*. A receiving aperture 48 extends between the pair of side surfaces 40*a*, 40*b* and is generally perpendicular to the hub aperture 36. A friction generating member 38 may be coupled to the cutout 46 or stepped portion. The friction generating member 38 may include a pair of lobes 50*a*, 50*b* and a cross member 52 may extend between coupling to each of the pair of lobes 50*a*, 50*b*. The cross member 52 may be an elongated member integrally formed with the pair of lobes 50*a*, 50*b* such that the friction generating member 38 is a monolithic structure. The cross member 52 include a lower surface 54*a* and an opposite upper surface 54*b*. Each of the pair of lobes 50*a*, 50*b* are hollow or open and thus include an outer surface 56*a* and an inner surface 56*b* that define a thickness of the lobe. Each of the pair of lobes 50*a*, 50*b* fit within the respective cutout 46 of each of the respective side surfaces 40*a*, 40*b* such that the inner surface 56*b* abuts within the respective cutout 46 or stepped portion and each of the lobes 50*a*, 50*b* follows an outer circumference of the side surfaces 40*a*, 40*b* and such that the pair of side surfaces 40*a*, 40*b* of the hub portion 16 extend through the hollow or open portion of the pair of lobes 50*a*, 50*b*. Further, portions of the outer surface 56*a* of the respective pair of lobes 50*a*, 50*b* are exposed and may make contact with or abut the friction generating surface 28 of the housing 12 to slidably engage with one another, as discussed in greater detail herein. Further, the cross member 52 may be received within the receiving aperture 48. The receiving aperture 48 is open to the hub aperture 36 such that the lower surface 54*a* of the cross member 52 is exposed in the hub aperture 36 in a direction perpendicular to the opening of the hub aperture 36. The friction generating member 38 may be formed via injection molding such as a one-shot, or via additive manufacturing techniques.

Figure 5:
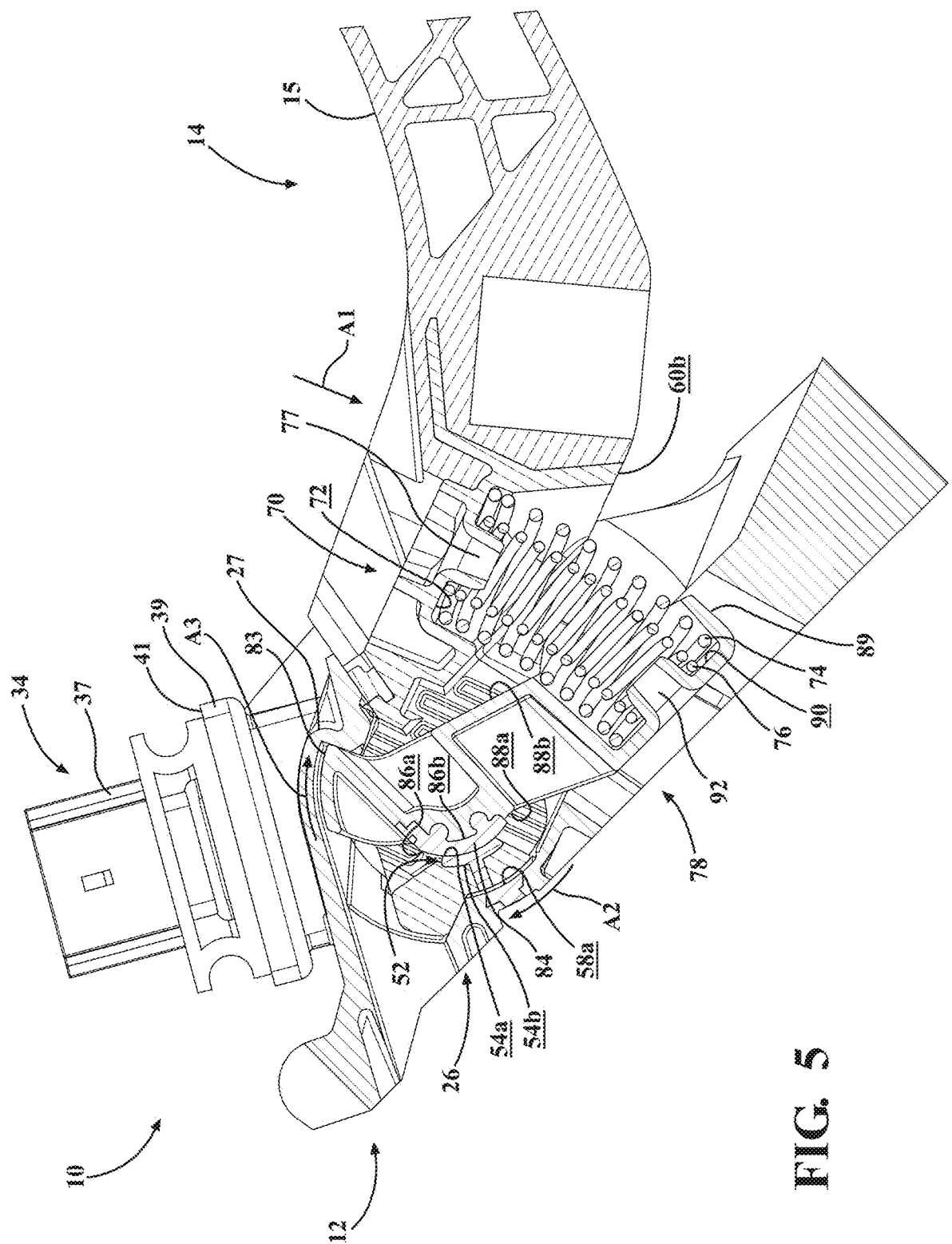
FIG. 5 schematically depicts a partial cross-sectional view of the electronic throttle pedal assembly of FIG. 1 taken from line 4-4 with a pedal arm in a depressed state according to one or more embodiments shown and described herein.
Figure 7:
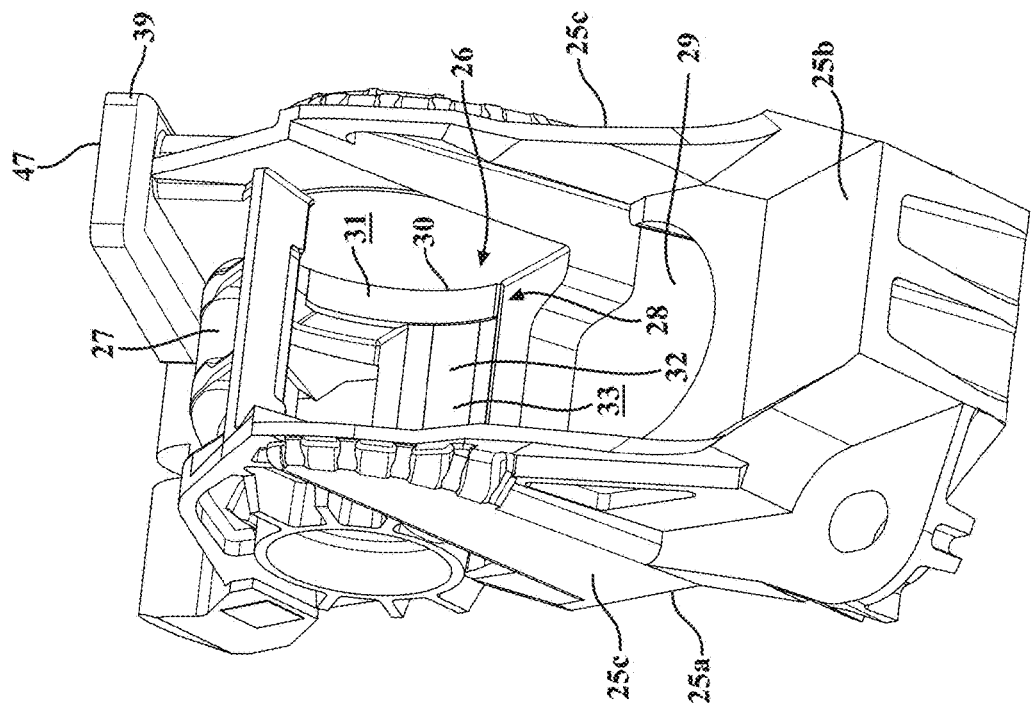
FIG. 7 schematically depicts an isolated view of the housing of the electronic throttle pedal assembly of FIG. 6 according to one or more embodiments shown and described herein.
Figure 6:
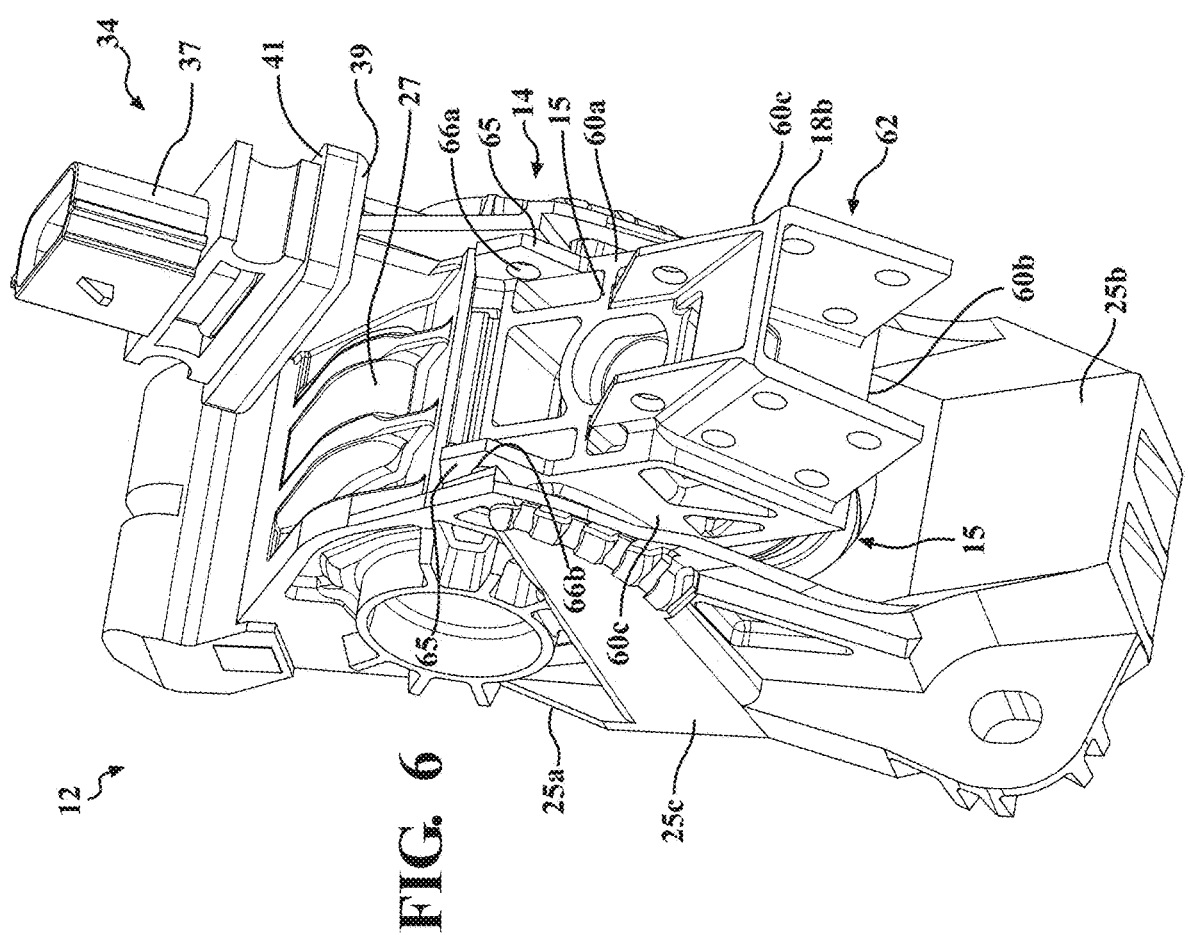
FIG. 6 schematically depicts a partial isolated view of a housing and a pedal arm of the electronic throttle pedal assembly of FIG. 1 according to one or more embodiments shown and described herein.

As such, the friction generating member 38 may be positioned on each of the side surfaces 40*a*, 40*b* and may have a corresponding geometry to that of the curvilinear shape of the side surfaces 40*a*, 40*b* of the hub portion 16. An uppermost surface 58*a*, 58*b* and the uppermost surface 44 of the hub portion 16 may all extend to the same height in the vertical direction (i.e., in the +/−Z direction) so to have a smooth contour between each of them and to allow for even movement or rotation against the friction generating surface 28 of the housing 12. That is, the uppermost surface 58*a*, 58*b* and the uppermost surface 44 of the hub portion 16 each abut or engage with the friction generating surface 28 of the housing 12. As such, the uppermost surface 44 of the hub portion 16 and the uppermost surface 58*a*, 58*b* of the friction generating member 38 may be at a corresponding radius to the friction generating surface 28 of the housing 12 to ensure smooth movement of the uppermost surface 44 of the hub portion 16 and the uppermost surface 58*a*, 58*b* of the friction generating member 38 with respect to the friction generating surface 28 of the housing 12. That is, as the pedal arm 15 is pivoted, moved, or rotated, the uppermost surface 58a, 58b of the friction generating member 38 and the uppermost surface 44 of the hub portion 16 slidably engage with the portions of the friction generating surface 28 of the housing 12 to form one of at least two independent friction generating surfaces, as best illustrated in FIG. 5 and as discussed in greater detail herein.

Figures 8, 9:
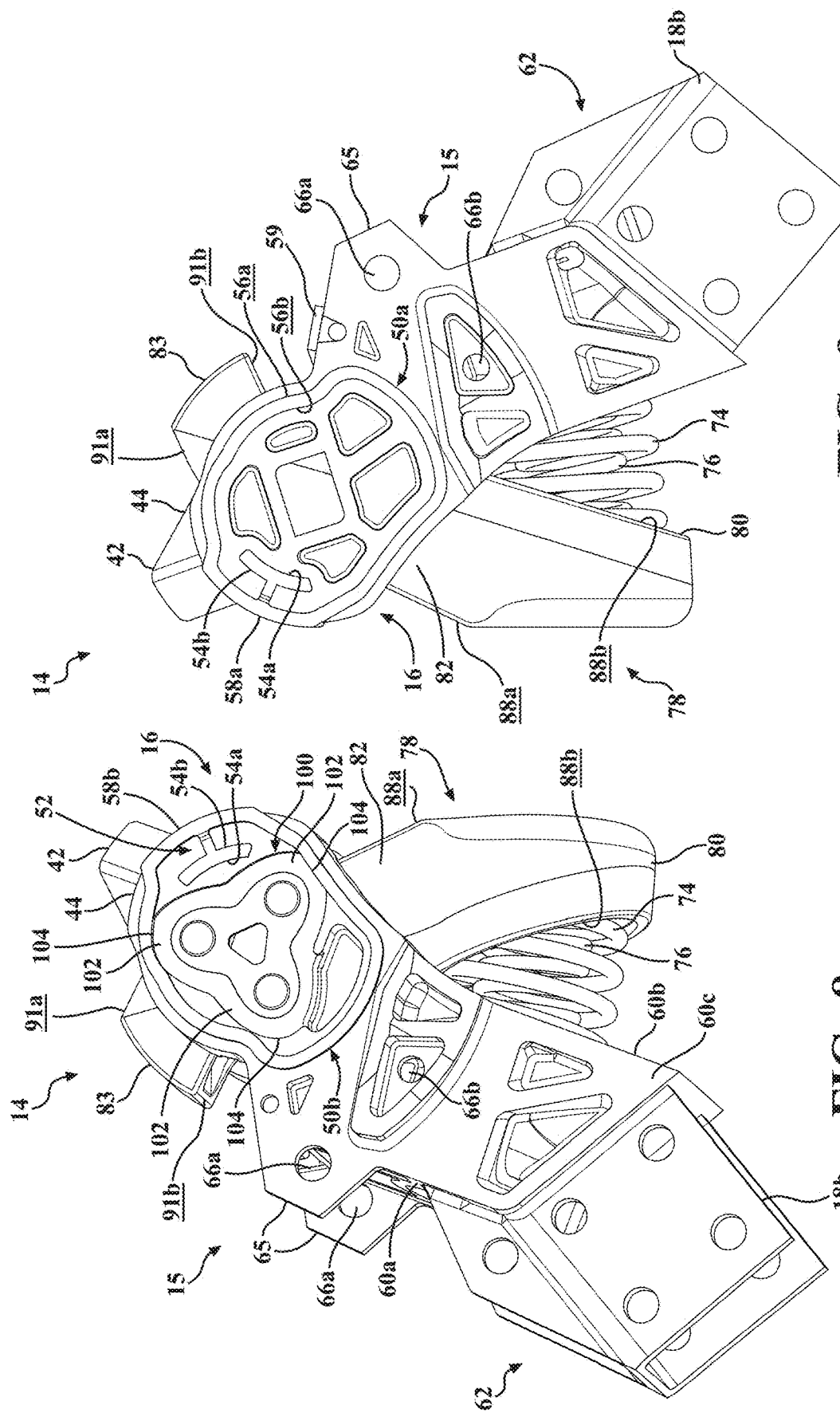
FIG. 8 schematically depicts an isolated left side perspective view of the pedal arm assembly of the electronic throttle pedal assembly of FIG. 1 according to one or more embodiments shown and described herein.
FIG. 9 schematically depicts an isolated right side perspective view of the pedal arm assembly of the electronic throttle pedal assembly of FIG. 1 according to one or more embodiments shown and described herein.
Figure 10:
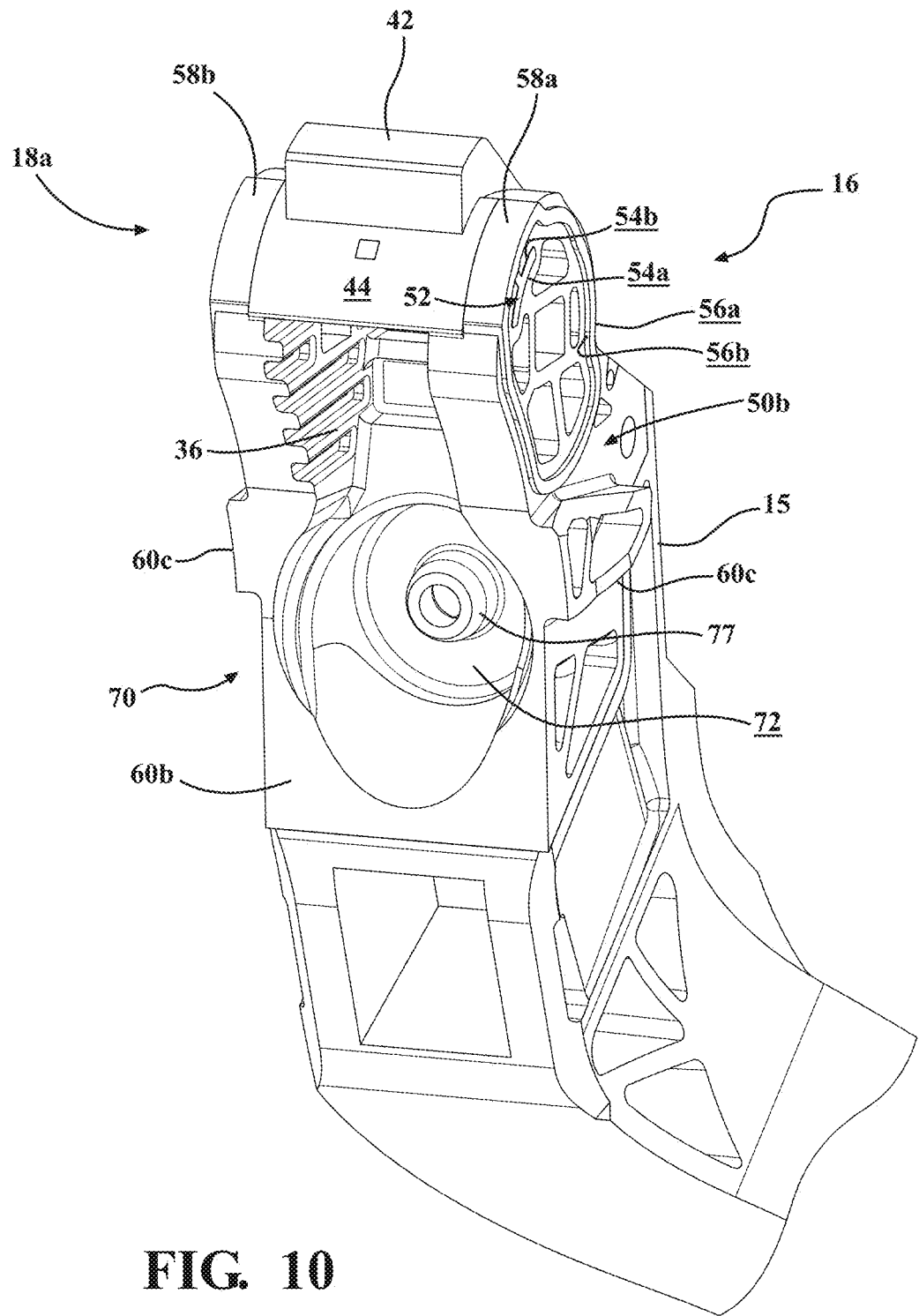
FIG. 10 schematically depicts an isolated rear view of the pedal arm of the electronic throttle pedal assembly of FIG. 1 according to one or more embodiments shown and described herein.

As best illustrated in FIG. 9, the pedal arm 15 includes an idle stop 59 to prevent over movement or over rotation of the spring carrier 78 as discussed in greater detail herein. The idle stop 59 may be made of a soft material than the pedal arm 15 and/or the housing to reduce noise. For example, the idle stop 59 may be made from various materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like.

Still referring to FIGS. 1-10, the lower arm portion 18b of the pedal arm 15 may include a pedal receiving portion 62 which may be sized with a smaller outer shape than that of the such that the having a be sized and shaped to be received by any number of lower pedal arms, such as the lower pedal arm 20. That is, the pedal receiving portion 62 may have a smaller area than a receiving cavity 64 of the lower pedal arm 20 such that the pedal receiving portion 62 is received within the receiving cavity 64 of the lower pedal arm 20. Further, the pedal arm 15 may include a pair of angled protrusions 65 that each include at least one fastening aperture 66a that each receive a corresponding at least one protrusion 68a of the lower pedal arm 20 that is shaped and sized to be received in the at least one fastening aperture 66a. A second at least one fastening aperture 66b is positioned on pedal arm 15 and is sized and shaped to receive a second at least one protrusion 68b of the lower pedal arm 20.

As such, this arrangement ensures that the lower pedal arm 20 is fully seated onto the pedal receiving portion 62. Further, this arrangement permits for a plurality of differently shaped and types of lower pedal arms to be added or swapped onto the pedal receiving portion 62. That is, with this arrangement, the pedal receiving portion 62 of the pedal arm 15 may be a universal connector that is adapted to receive the plurality of differently shaped and types of lower pedal arms such that flexibility exists to change or modify a lower pedal arm 20 without changing the housing 12 and/or the pedal arm assembly 14.

The inner surface 60b of the pedal arm includes a spring receiving portion 70. The spring receiving portion 70 is positioned between the upper portion 18a and the lower arm portion 18b of the pedal arm 15. The spring receiving portion 70 may be an indention or damper mounting area operable to hold a pair of springs or a damper, as discussed in greater detail herein. The spring receiving portion 70 may generally be circular and include a spring surface 72 adapted to receive an outer spring 74 and an inner spring 76, as discussed in greater detail herein. The spring surface 72 includes a generally circular holding portion and a central protrusion 77 to keep the outer spring 74 and the inner spring 76 in place.

In some embodiments, the pedal arm 15 may be formed with a multi-shot injection molding process. The pedal arm 15 may be formed with various materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like. In other embodiments, the pedal arm 15 may be formed using additive manufacturing techniques or other known techniques.

The ETC pedal assembly 10 further includes a spring carrier 78. The spring carrier 78 is coupled to the pedal arm 15 and is received within the housing 12 by at least a distal end 83 received within the hub aperture 36 of the hub 16 of the pedal arm 15. The spring carrier 78 includes a rear surface 88a and an opposite front surface 88b that define a thickness. A spring receiving portion 80 is positioned within the front surface 88b and an arm portion 82 extends from a proximate end 89 to the distal end 83 or tip. The arm portion 82 may extend from and may be integrally formed with the spring receiving portion 80. The distal end 83 includes a distal exterior surface 91a and an opposite distal inner surface 91b. In some embodiments, the distal inner surface 91b is angled from the front surface 88b by theta $\theta^1$ less than 180 degrees. Further, in some embodiments, the distal exterior surface 91a is angled from the rear surface 88a by theta $\theta^2$ less than 180 degrees. As such, the distal end 83 is angled with respect to the arm portion 82. Further, a portion of the distal end 83 or tip extends beyond the front surface 88b of the spring carrier in the vertical direction (i.e., in the +/−Z direction) to extend below the front surface 88b.

Still referring to FIGS. 1-10, a friction generating portion 84 that has an upper surface 86a and an opposite lower surface 86b extends from the rear surface 88a of the arm portion 82 of the spring carrier 78. In some embodiments, the rear surface 88a of the arm portion 82 includes a pair of receiving channels 95 that are configured to receive a pair of protrusions 97 extending from the lower surface 86b of the friction generating portion 84. As such, the friction generating portion 84 may be in a snap fit type configuration with the spring carrier 78, or a one-shot injection molding. In other embodiments, the friction generating portion 84 is coupled to the spring carrier 78 via fasteners, such as screws, bolts and nuts, epoxy, adhesive, and/or the like.

The friction generating portion 84 extends from the rear surface 88a of the arm portion 82 between the spring receiving portion 80 and the distal end 83 or tip. In some embodiments, the friction generating portion 84 is arcuate in shape. In other embodiments, the friction generating portion 84 is linear or curvilinear in shape.

The spring receiving portion 80 is depressed or recessed within the front surface 88b of the spring carrier 78. The spring receiving portion 80 includes a spring receiving surface 90 adapted to receive an opposite end of the outer spring 74 and the inner spring 76 than that received by the spring receiving portion 70. The spring receiving surface 90 includes a generally circular holding portion and a central protrusion 92 to keep the outer spring 74 and the inner spring 76 in place.

The distal end 83 or tip of the spring carrier 78 is received within the hub aperture 36 of the hub portion 16 to engage with portions of the hub friction generating member 38 within the hub aperture 36 of the hub portion 16 of the pedal arm 15 dependent on an upstroke or down stoke of the pedal arm 15, as discussed in greater detail herein. As such, the spring carrier 78 is supported by the distal end 83 or tip within the hub aperture 36 of the hub portion 16 and within the pocket portion 27 positioned within the hub receiving cavity 26 of the housing 12.

That is, the upper surface 86a of the friction generating portion 84 abuts or is otherwise in contact with the lower surface 54a of the cross member 52 of the friction generating member 38. As such, the spring carrier 78 causes the abutting surfaces of the upper surface 86a of the friction generating portion 84 and the lower surface 54a of the cross member 52 of the friction generating member 38 to generate a friction between them upon movement of the pedal arm 15.

In some embodiments, the spring carrier 78 may be formed with various materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like. In other embodiments, the spring carrier 78 may be formed using additive manufacturing techniques or other known techniques.

The friction generating portion 84 may be formed with the same material as the spring carrier 78 or from a different material than the spring carrier. As a non-limiting example, both the friction generating portion 84 and the spring carrier 78 may be formed with an acrylonitrile butadiene styrene material. In another non-limiting example, the spring carrier 78 may be formed with an acrylonitrile butadiene styrene material and the friction generating portion 84 may be formed with nylon or a combination of different material such as polypropylene and nylon. Further, the friction generating portion 84 and the spring carrier 78 may each share a common material and have different additional materials. In a non-limiting example, the spring carrier 78 may be formed with acrylonitrile butadiene styrene and polyethylene terephthalate while the friction generating portion 84 may be formed with acrylonitrile butadiene styrene and thermoplastic elastomer.

It should now be understood that the friction generating portion 84 of the spring carrier 78, the friction generating member 38 of the hub portion 16 and the friction generating surface 28 of the housing 12 may each be independently manipulated or changed to change the hysteresis. For example, the amount of material (i.e., the thickness) may be varied to independently change aspect to the various friction generating surfaces. Another example would be to vary the materials that each of the various friction generating surfaces are made from to change the friction characteristics, which in turn change the hysteresis.

Still referring to FIGS. 1-10, the outer spring 74 has an inner diameter D1 that is larger than an outer diameter D2 of the inner spring 76 such that the inner spring is received by the outer spring 74. The outer and inner springs 74, 76, in the assembled state, are coaxially aligned. Each of the outer and inner springs 74, 76 extend between the spring receiving portion 70 of the inner surface 60b of the pedal arm 15 and the spring receiving portion 80 of the spring carrier 78.

When the pedal arm is depressed, the outer spring 74 and the inner spring 76 displace the spring carrier 78 such that a portion of the spring carrier 78 leverages against the housing 12 to load the pedal arm 15 pivot as it rotates. As the outer spring 74 and the inner spring 76 compress due to the rotation of the pedal arm 15, the spring carrier 78 continues to transfer the load into the pivot of the pedal arm 15. As such, with the load applied, the friction generating portion 84 is positioned against the exposed portion of the cross member 52 of the friction generating member 38. As such, embodiments described herein disclose of at least two independent friction generating surfaces to create a hysteresis proportional to the depression of the pedal arm 15.

In some embodiments, each of the outer spring 74 and the inner spring 76 may be formed with a steel material. In other embodiments, each of the outer spring 74 and the inner spring 76 may be formed with stainless steel, wire, carbon steel, alloy steel, elgiloy, Monel®, copper, nickel, and/or the like.

A connector assembly 34 extends from the housing 12 through the connector opening 39. The connector assembly 34 may include a plurality of terminals 35, a circuit board 43, and a connector 37, and the like, to communicatively and/or electrically connect the pedal assembly 10 to other components of a vehicle such as an electronic control module and/or a powertrain controller. In some embodiments, the connector assembly 34 is overmolded. The circuit board 43 may be a printed circuit board and may also be included as part of the sensor assembly 94, as discussed in greater detail herein.

The sensor assembly 94 may include the circuit board 43, which may include at least one receiver coil 96 and a transmitter coil 98, and a coupler 100. The coupler 100 may be mounted or attached to the hub portion 16 of the pedal arm 15 in the vicinity of and perpendicular to the pivot axis. As such, the coupler 100 may be positioned adjacent to the at least one receiver coil 96. In some embodiments, the coupler 100 may include distinct lobes, 102, such as three lobes as illustrated in FIG. 8. The coupler 100 may rotate or pivot upon movement of the hub portion 16 of the pedal arm 15. An outermost portion 104 of each lobe 102 is positioned within the inner surface 56b of the lobe 50b of the friction generating member 38.

The at least one receiver coil 96 and the transmitter coil 98 detect the movements of the coupler 100 and that data is transmitted to an ECU and/or powertrain controller communicatively coupled to the sensor assembly 94 via the connector 37 of the connector assembly 34. The sensor assembly 94 may include overmould to encapsulate the electronic components, and it may include solderless connections between PWA and terminal pins, such as compliant through-hole pins.

Figure 4:
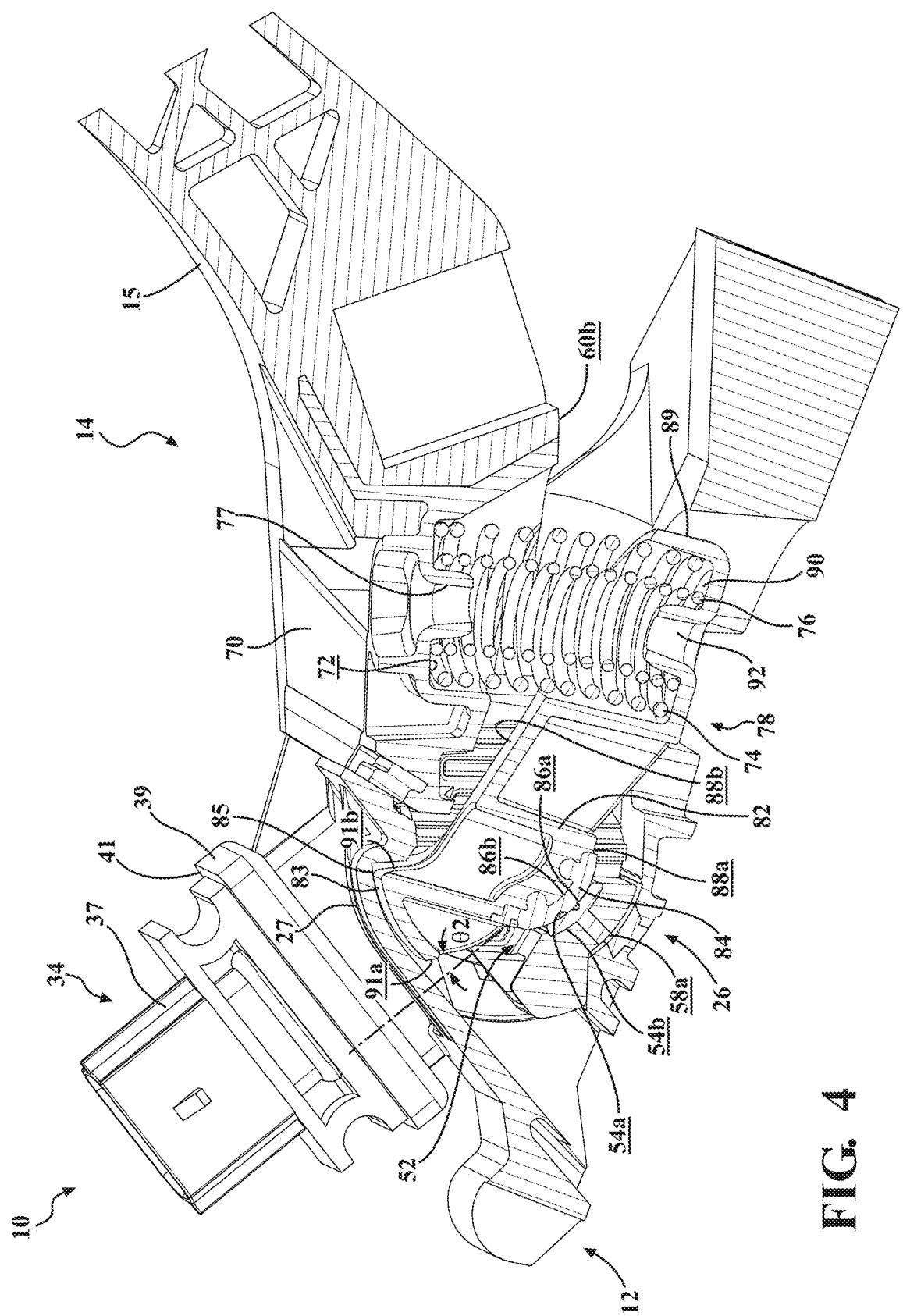
FIG. 4 schematically depicts a partial cross-sectional view of the electronic throttle pedal assembly of FIG. 1 taken from line 4-4 with a pedal arm in a undepressed state according to one or more embodiments shown and described herein.

Now referring to FIGS. 4-5, in operation, one end of the spring carrier 78 is loaded by the outer and inner springs 74, 76 which acts against the pedal arm 15 and the other, opposite end, is supported within the hub aperture 36 of the pedal arm 15 and may be partially supported by the housing 12 to press the upper surface 86*a* of the friction generating portion 84 of the arm portion 82 against the lower surface 54*a* of the cross member 52 of the friction generating member 38. As the pedal arm 15 moves, as indicated by arrow A1 in FIG. 5, the pedal arm 15 pivots, and/or travels, the loads between spring carrier 78 and the pedal arm 15 and the loads between the pedal arm 15 and the friction generating surface 28 of the housing 12 independently create friction. The friction is created by movement of the spring carrier 78 against the cross member 52 of the pedal arm 15 in the direction A3 as depicted in FIG. 5, and movement of the hub portion 16 against the friction generating surface 28 of the housing 12 in the direction A2, as depicted in FIG. 5. This created friction resists the motion and creates the mechanical hysteresis. Additionally, as the pedal arm 15 moves, pivots, and/or travels, the outer and inner springs 74, 76 increases in load, which in turn increases both the return force on the pedal arm 15 directly and the magnitude of friction acting on the pedal arm 15.

Figure 11:
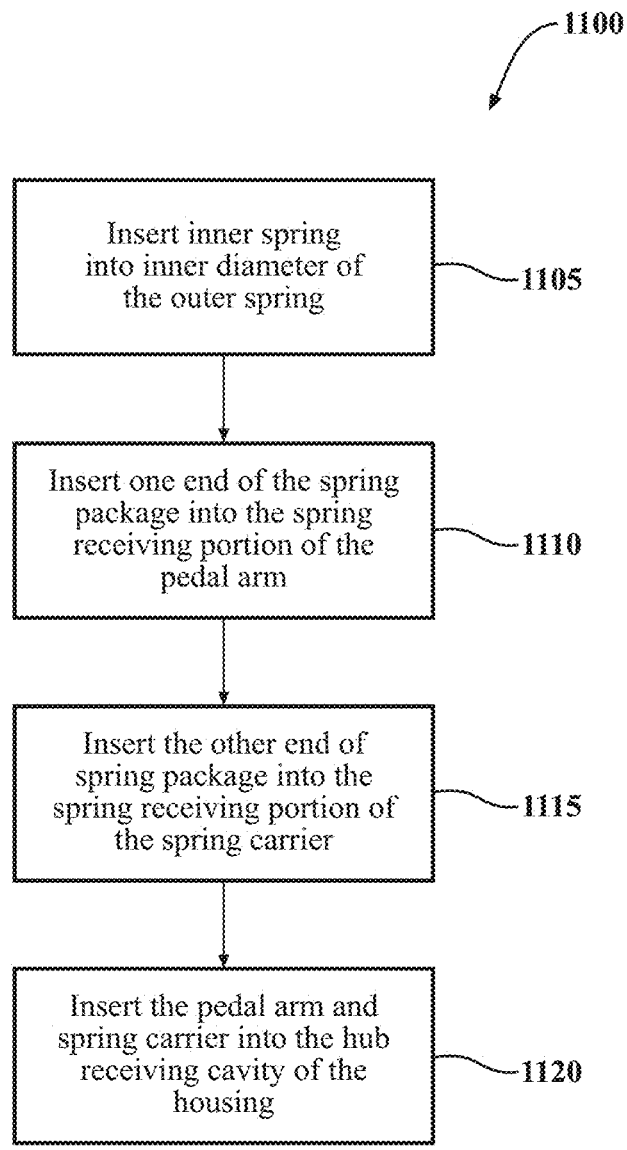
FIG. 11 schematically depicts an illustrative flowchart for a method of installing a pedal arm assembly into a housing according to one or more embodiments shown and described herein.

Referring now to FIG. 11 which is a flow diagram that graphically depicts an illustrative method 1100 of installing the pedal arm assembly 14 into the housing 12 is provided. Although the steps associated with the blocks of FIG. 11 will be described as being separate tasks, in other embodiments, the blocks may be combined or omitted. Further, while the steps associated with the blocks of FIG. 11 will described as being performed in a particular order, in other embodiments, the steps may be performed in a different order.

To install the pedal arm assembly 14 into the housing 12, at block 1105, the inner spring 76 is inserted into an inner diameter of the outer spring 74 to form a spring package. At block 1110, one end of the spring package is inserted into the spring receiving portion 70 of the pedal arm 15. At block 1115, the other end of the spring package is inserted into the spring receiving portion 80 of the spring carrier. The spring carrier 78 and the pedal arm 15 are inserted into the hub receiving cavity 26 of the housing 12, at block 1120. As such, the spring carrier 78 and the pedal arm 15 are movably coupled to the housing 12.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An electronic throttle control pedal assembly comprising:
   a housing having a cavity;
   a member having a friction generating surface positioned within the cavity of the housing; and
   a pedal arm having a hub portion and a friction generating member, the friction generating member having a lobe, the lobe having an opening and positioned on a side surface of the hub portion, the side surface of the hub having an outer circumference, at least a portion of the outer circumference of the side surface of the hub portion is received within the opening, the pedal arm is pivotally connected to the housing at the hub portion,
   wherein when the pedal arm is depressed, the pedal arm pivotally engages at least a portion of the lobe of the friction generating member against at least a portion of the friction generating surface thereby creating a hysteresis proportional to the depression of the pedal arm.

2. The electronic throttle control pedal assembly of claim 1, wherein:
   the hub portion includes another side surface opposite the side surface, each of the side surfaces are curvilinear shaped, the side surfaces are separated by a hub aperture and connected by an upper surface of the pedal arm.

3. The electronic throttle control pedal assembly of claim 2, wherein:
   the friction generating member includes a second lobe spaced apart from the lobe, the second lobe having a second opening and is positioned on the another side surface of the hub portion such that at least a portion of the another side surface of the hub portion is received within the opening.

4. The electronic throttle control pedal assembly of claim 3, wherein each of the lobe and the second lobe of the friction generating member are shaped to geometrically match the curvilinear shape of the side surface and the another side surface of the hub portion.

5. The electronic throttle control pedal assembly of claim 3, further comprising:
   a spring carrier coupled to the pedal arm and received within the cavity of the housing; and
   at least one spring positioned to be in contact with the pedal arm and the spring carrier, wherein:
      the pedal arm further includes an exterior surface and an opposite interior surface;
      the at least one spring extending between the interior surface of the pedal arm and the spring carrier; and
      the hub aperture extends through the interior surface and the exterior surface of the pedal arm at the hub portion, a portion of the spring carrier is positioned within the hub aperture to engage with a portion of the friction generating member positioned within the hub aperture when a load from the at least one spring is applied to the spring carrier.

6. The electronic throttle control pedal assembly of claim 5, wherein the spring carrier further comprises:
   a spring receiving portion; and
   an arm portion extending from and integrally formed with the spring receiving portion,
   wherein the at least one spring is received by the spring receiving portion.

7. The electronic throttle control pedal assembly of claim 6, wherein the at least one spring further comprises:
   an outer spring having an inner diameter and extending between the interior surface of the pedal arm and the spring receiving portion of the spring carrier; and
   an inner spring positioned within the inner diameter of the outer spring and extending between the interior surface of the pedal arm and the spring receiving portion of the spring carrier.

8. The electronic throttle control pedal assembly of claim 6, wherein the spring carrier further comprises a friction generating portion positioned on a surface of the arm portion.

9. The electronic throttle control pedal assembly of claim 1, further comprising:
a sensor assembly having:
a coupler rotatably mounted to one side of the hub portion;
at least one receiver coil positioned adjacent to the coupler; and
at least one transmitter coil,
wherein movement of the coupler is detected by the at least one receiver coil.

10. The electronic throttle control pedal assembly of claim 1, wherein the pedal arm is formed from a multi-shot injection molding.

11. The electronic throttle control pedal assembly of claim 1, wherein the friction generating surface is arcuate in shape.

12. The electronic throttle control pedal assembly of claim 1, wherein the pedal arm is a universal connector configured to independently couple to at least one lower pedal arms.

13. A pedal assembly for a vehicle comprising:
a housing having cavity;
a member having a friction generating surface positioned within the cavity of the housing; and
a pedal arm assembly having a pedal arm, the pedal arm further including:
a hub portion having an outer circumference; and
a friction generating member,
wherein the hub portion is curvilinear in shape, the friction generating member having a lobe, the lobe having an opening and positioned on a side surface of the hub portion such that at least a portion of the outer circumference of the side surface of the hub portion is received within the opening of the lobe, the lobe shaped to geometrically match the curvilinear shape of the hub portion, the pedal arm is pivotally connected to the housing at the hub portion,
wherein when the pedal arm is depressed, movement of the pedal arm slidably engages a portion of the friction generating member against a portion of the friction generating surface thereby creating a hysteresis proportional to the depression of the pedal arm.

14. The pedal assembly of claim 13, wherein the pedal arm further comprises:
an exterior surface and an opposite interior surface; and
a hub aperture extending through the interior surface and the exterior surface of the pedal arm at the hub portion.

15. The pedal assembly of claim 14, further comprises:
a spring carrier coupled to the pedal arm and received within the cavity of the housing, the spring carrier having a spring receiving portion at a first end and an arm portion extending from the spring receiving portion to a distal tip, the arm portion extends from and integrally formed with the spring receiving portion, the arm portion having a friction generating portion positioned on a surface; and
at least one spring positioned to be in contact with the pedal arm and the spring carrier.

16. The pedal assembly of claim 15, further comprising:
an outer spring having an inner diameter and extending between the interior surface of the pedal arm and the spring receiving portion of the spring carrier; and
an inner spring positioned within the inner diameter of the outer spring and extending between the interior surface of the pedal arm and the spring receiving portion of the spring carrier,
wherein the outer spring and the inner spring are each received by the spring receiving portion.

17. The pedal assembly of claim 13, further comprising:
a sensor assembly having:
a coupler rotatably mounted to one side of the hub portion;
at least one receiver coil positioned adjacent to the coupler; and
at least one transmitter coil,
wherein movement of the coupler is detected by the at least one receiver coil.

18. The pedal assembly of claim 13, wherein the friction generating surface is arcuate in shape.

19. The electronic throttle control pedal assembly of claim 13, wherein the pedal arm is a universal connector configured to independently couple to at least one lower pedal arms.

20. A pedal assembly comprising:
a housing having a cavity;
a member having a friction generating surface positioned within the cavity of the housing;
a two piece pedal arm, one portion of the two piece pedal arm having a pedal pad, an another portion of the two piece pedal arm having a hub portion and a friction generating member, the friction generating member having a lobe, the lobe having an opening and positioned on a side surface of the hub portion, the side surface of the hub having an outer circumference, at least a portion of the outer circumference of the side surface of the hub portion is received within the opening, the two piece pedal arm is pivotally connected to the housing at the hub portion,
wherein when the pedal pad is depressed, the another portion of the two piece pedal arm pivotally engages at least a portion of the lobe of the friction generating member against at least a portion of the friction generating surface thereby creating a hysteresis proportional to the depression of the pedal pad.

* * * * *